United States Patent [19]

Leppänen

[11] Patent Number: 5,758,286
[45] Date of Patent: May 26, 1998

[54] METHOD FOR ACCOMPLISHING A MOBILE TELECOMMUNICATIONS CONNECTION USING ABBREVIATED DIALING

[75] Inventor: Osmo Leppänen, Lahti, Finland

[73] Assignee: Telecom Finland Oy, Helsinki, Finland

[21] Appl. No.: 602,803

[22] PCT Filed: Aug. 18, 1994

[86] PCT No.: PCT/FI94/00359

§ 371 Date: Feb. 26, 1996

§ 102(e) Date: Feb. 26, 1996

[87] PCT Pub. No.: WO95/06381

PCT Pub. Date: Mar. 2, 1995

[30] Foreign Application Priority Data

Aug. 26, 1993 [FI] Finland ............ 933744
Jun. 15, 1994 [FI] Finland ............ 942842

[51] Int. Cl.[6] .................................... H04Q 7/38
[52] U.S. Cl. .................. 455/445; 455/461; 455/403; 455/405; 455/406
[58] Field of Search ................. 379/58; 370/85.13; 455/403, 405, 406, 408, 461

[56] References Cited

U.S. PATENT DOCUMENTS

| | | | |
|---|---|---|---|
| 5,410,588 | 4/1995 | Ito | 379/58 |
| 5,473,668 | 12/1995 | Nakahara | 379/58 |
| 5,504,746 | 4/1996 | Meir | 370/85.13 |

*Primary Examiner*—William Cumming
*Attorney, Agent, or Firm*—Cohen, Pontani, Lieberman, Pavane

[57] ABSTRACT

A method for placing a call from a first mobile station to a second mobile station using predetermined abbreviated dialing. An A-subscriber dials a short number at the first mobile station which is received by a mobile telephone exhange. The short number is compared to a group of short numbers each having an associated public telephone number corresponding to a unique second mobile station. If a match is found, the associated public telephone number is dialed and a coomunication path is established between the first and the second mobile stations. A billing record of this communication path is recorded at the mobile telephone exchange. Furthermore, the communication between the first and the second mobile stations may be marked as a transferred call to prevent further call transfers.

8 Claims, 3 Drawing Sheets

METHOD FOR ACCOMPLISHING A MOBILE TELECOMMUNICATIONS CONNECTION USING ABBREVIATED DIALING

BACKGROUND OF THE INVENTION

1. Field of the Invention

The present invention is directed to a method for accomplishing a telecommunication connection from a mobile communication network A-subscriber connection.

2. Description of the Related Art

It has heretofore been possible to form a group of subscribers, for example inside a company, using PABX (private automatic branch exchange) extension numbers to enable such subscribers to make internal calls inside the group using the PABX extension numbers. When a subscriber in the PABX group has made a call using an extension in the group, the extension number and the caller number are transferred in the call initiating message through the base station to the mobile telephone exchange, wherefrom a subscriber register connected to the exchange and using the information received in the initiating message is checked to verify that the subscriber has the right to use the extension number, after which the number is transformed to a PSTN (public switched telephone network) subscriber number using a number transformation table. The exchange gives a separate announcement to billing information about this call, so that the call can be billed in a special way. The problem of implementations like this is that they are restricted to a specific PABX group or to a specific base station area.

DETAILED DESCRIPTION OF THE PRESENTLY PREFERRED EMBODIMENTS

Mobile station subscribers call repeatedly to a same group of numbers, which may include a certain client, home, an institution or similar. To make these calls even more convenient, the operator can give to the mobile phone subscriber abbreviated numbers for often made or repeated calls which can be billed differently, as for example more profitably than calls which are made using normal subscriber numbers.

In the method of the invention the mobile phone subscriber's calls can be grouped in billing using starting numbers.

Figure 1:
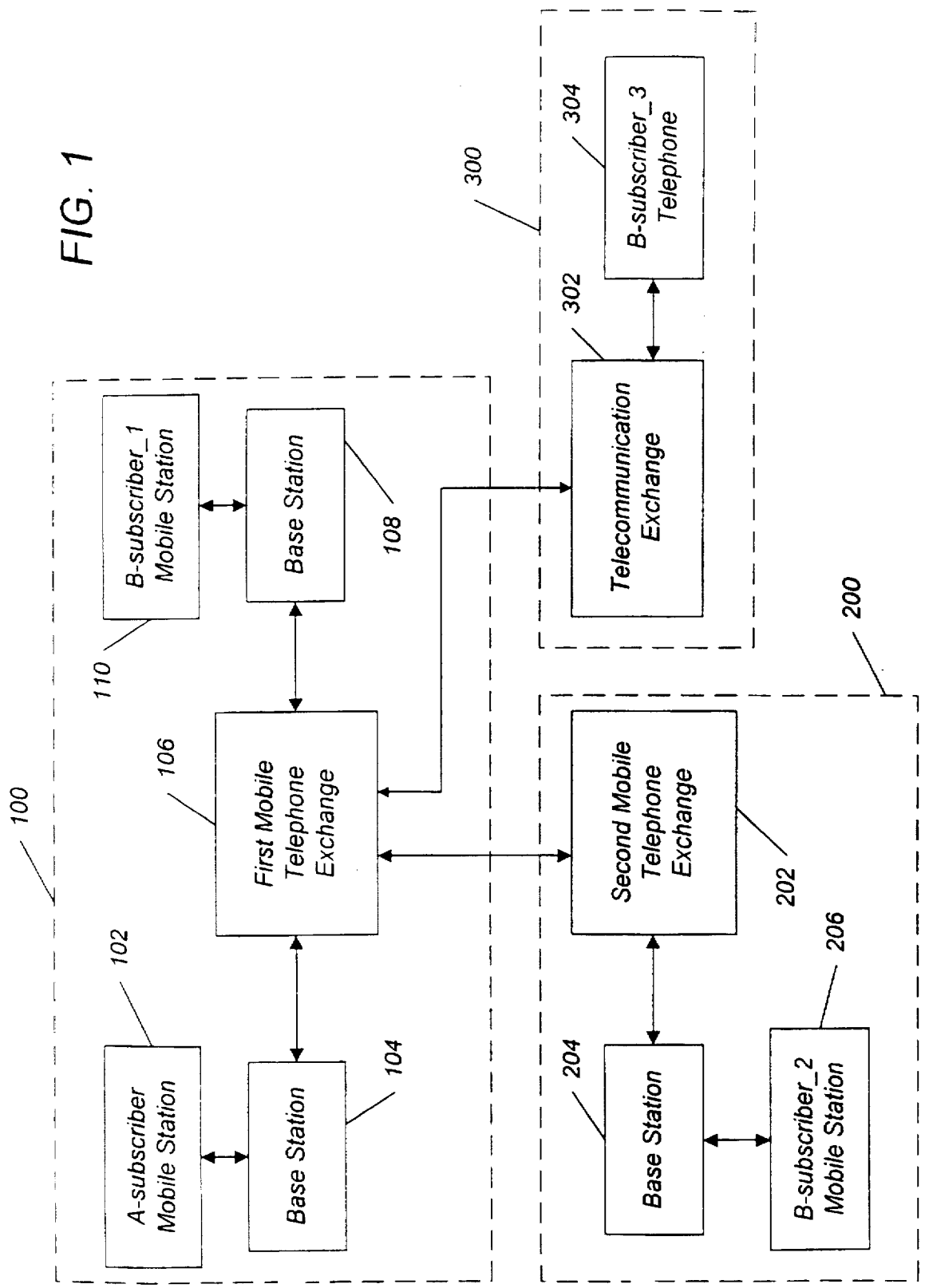
FIG. 1 is a block diagram of an apparatus for establishing a communication path between an A-subscriber connection and one or more B-subscriber connections in accordance with the present invention.

The object of the invention is a method for accomplishing a connection from a mobile communication network A-subscriber connection, to a mobile communication network or other telecommunication network B-subscriber connection, for thus making a call with a mobile station. Referring now to FIG. 1, a first mobile communication network 100 includes an A-subscriber mobile station 102 and a base station 104 with a limited coverage area, to which the A-subscriber mobile station has a connection, a B-subscriber__1 mobile station 110, and a base station 108 with a limited coverage area, to which the B-subscriber__1 mobile station has a connection, and a first mobile telephone exchange 106, connected to base stations 104 and 108, to switch the connections within the first mobile communication network 100 and from it to other communication networks and vice versa.

In another embodiment of the present invention, the first mobile communication network 100 may be connected to a second mobile communication network 200, having a B-subscriber__2 mobile station 206, and a base station 204 with a limited coverage area, to which the B-subscriber__2 mobile station has a connection, and a second mobile telephone exchange 202, connected to the base station 204, to switch the connections within the second mobile communication network 200 and from it to other communication networks and vice versa.

In yet another embodiment of the present invention, the first mobile communication network 100 may instead be connected to a telecommunication network 300, having a B-subscriber__3 telephone 304 connected to a telecommunication exchange 302, for switching the connections within the telecommunication network 300 and from it to other communication networks and vice versa.

In a further embodiment of the present invention, the first mobile communication network 100 may be connected to both second mobile communication network 200 and the telecommunication network 300.

While only a small number of base stations (104,108,204) and mobile stations (102, 110, 206) are shown in FIG. 1, it should be understood that a plurality of base stations and corresponding mobile stations may be connected to each of the first and second mobile telephone exchanges 106 and 206, respectively. As a practical matter, the maximum number of base stations and corresponding mobile stations which may be simultaneously connected to each of the first and second mobile telephone exchanges 106 and 206, respectively, is limited only by the bandwidth and throughput of each mobile telephone exchange. Similarly, while only one telephone 304 is shown in FIG. 1, it should be understood that a plurality of telephones may be connected to the telecommunication exchange 302. As a practical matter, the maximum number of telephones which may be simultaneously connected to the telecommunication exchange 302 is limited only by its bandwidth and throughput.

Figure 2:
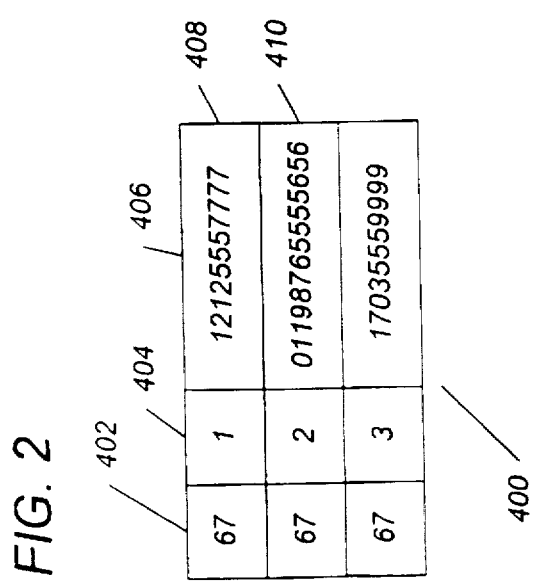
FIG. 2 is representative of a table for storing a prefix identifying all A-subscribers, abbreviated numbers assigned to A-subscriber, and public telephone numbers of the B-subscribers corresponding to the abreviated numbers in accordance with the present invention.

Referring now to FIG. 2, an exemplary table 400 for storing A-subscriber-related data is shown. Table 400 is preferably stored in the first mobile telephone exchange 106, and includes a column 402 which defines a prefix number common to all A-subscribers, for example, a number "67", a column 404 which defines fields for storing at least one abbreviated number selected for the A-subscriber, and column 406 defining fields for storing at least one public telecommunication network number ("public telephone number") of at least one B-subscriber. Preferably, each of the at least one abbreviated numbers is associated with a corresponding public telephone number selected from the at least one public telephone numbers. The public telephone number is the number that is normally dialed using a mobile station or a telephone to reach a particular B-subscriber. The prefix number identifies the A-subscriber as being in a group authorized to use a shortened number dialing service. For example, in a row 408, the prefix number is "67", the abbreviated number is "1" and the corresponding public telephone number is 12125557777.

While only three rows of table 400 are shown in FIG. 2, it should be noted that the table 400 can contain any number of rows. The number of rows is practically only limited by the data storage capacity of the first mobile telephone exchange 106. Furthermore, each of the prefix number, the abbreviated number, and the public telephone numbers are preferably alphanumeric sequences of digits of differing lengths. The particular numbers are shown in FIG. 2 only by way of example.

Connection from the A-subscriber mobile station 102 to a particular B-subscriber is made by first dialing, with the A-subscriber mobile station 102, a predetermined shortened telephone number which includes the prefix number from column 402 and the abbreviated number from column 404. After the A-subscriber mobile station 102 is connected to the first mobile communication telephone exchange 106 via the base station 104, in the first mobile telephone exchange 106 the shortened number dialed by the A-subscriber is analyzed using A-subscriber recognition, such as A-subscriber identity, and the A-subscriber's right to shortened number service is verified. The shortened number is then compared to the shortened numbers stored in the table 400 and a corresponding public telephone number of a B-subscriber is then retrieved from column 406. The first mobile telephone exchange 106 then initiates a connection between the A-subscriber mobile station 102 and a particular B-subscriber mobile station, (i.e., the B-subscriber_1 or B-subscriber-2 mobile stations 110, or 206, respectively, or the B-subscriber_3 telephone 304) by dialing the public telephone number corresponding to the particular B-subscriber mobile station. The connection may be accomplished between the A-subscriber and a B-subscriber who is associated with the first mobile communication network 100, between the A-subscriber and a B-subscriber who is associated with the second mobile telephone network 200 and also between the A-subscriber and a B-subscriber who is associated with the telecommunication network 300.

The following example illustrates the the method of the present invention. Assuming that the public telephone number in row 410 corresponds to the B-subscriber_2 mobile station 206, the A-subscriber, who wishes to reach B-subscriber_2, dials "67" followed by "1" using the A-subscriber mobile station 102. When the first mobile telephone exchange 106 receives the shortened number via the base station 104, the shortened number is compared to the shortened numbers stored in the table 400 and a corresponding public telephone number 01198765555656 for B-subscriber_2 is identified. The first mobile telephone exchange 106 then dials 01198765555656 and connects the A-subscriber mobile station 102 to the B-subscriber_2 mobile station 206 via the second mobile telephone exchange 202 and the base station 204, respectively.

A- and B-subscribers may be, for example, either NMT (Nordic Mobile Telephone) or GSM (Global System for Mobile Communications) subscribers. Short number tables, such as table 400 are formed from the short numbers which as they are selected.

In the first mobile telephone exchange 106 a billing record is made in which the connection to a B-subscriber is registered, and identified with the shortened number dialed by the A-subscriber. Furthermore, the connection from the first mobile telephone exchange 106 to the B-subscriber is preferably marked as a transferred call, which prevents further transfer of calls.

Figure 3B:
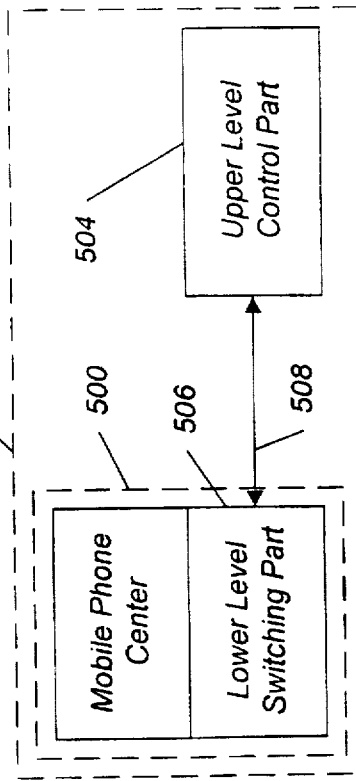
FIG. 3B is a block diagram of a second exemplary embodiment of the First Mobile Telephone Exchange block of FIG. 1 in accordance with the present invention.
Figure 3A:
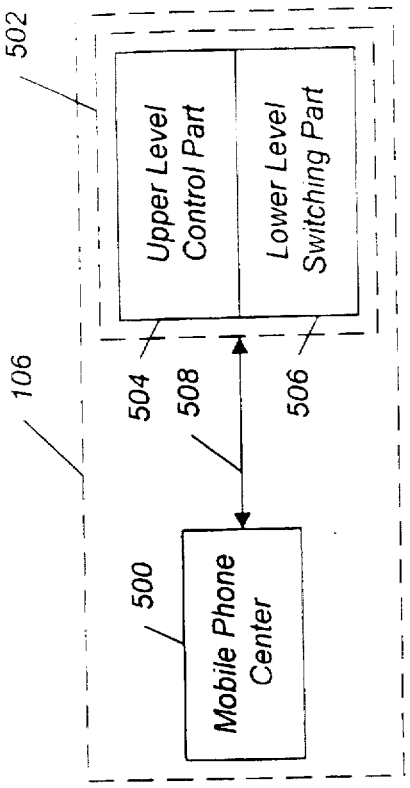
FIG. 3A is a block diagram of a first exemplary embodiment of the First Mobile Telephone Exchange block of FIG. 1 in accordance with the present invention.

Referring now to FIG. 3A, a first embodiment of the first mobile telephone exchange 106 is shown. The first mobile telephone exchange 106 includes a mobile phone center 500 which is connected to an intelligent network center 502 via a communication link 508. Alternatively, the mobile center 500 may incorporate the intelligent network center 502 in which case the communication link 508 is unnecessary. The intelligent network center 502 includes an upper level control part 504 for controlling the operation of the first mobile telephone exchange 106, and a lower switching part 506 for controlling the routing of connections various telecommunication network subscribers. The communication link 508 may be, by way of example, a public telecommunication network, a closed dedicated network, a permanent connection, or a direct channel.

When a call using a shortened number is placed by the A-subscriber to a B-subscriber through the first mobile telephone exchange 106, a billing record is recorded at the mobile phone center 500 using the shortened number to identify the connection to the B-subscriber. The A-subscriber's subscriber's shortened number is then analyzed to retrieve A-subscriber identification information and then modified to include a service key. The modified shortened number and A-subscriber identification information are then transmitted to the intelligent network center 502, where, on the basis of the A-subscriber's identification information, the A-subscriber's right to use the shortened 5 number service is verified. If the A-subscriber does not have a right to the service, if the table 400 is not found, or if the value of the shortened number is greater than the greatest number previously stored to the table 400, then the intelligent network center 502 releases the connection and transmits a "busy" tone to the A-subscriber.

Otherwise, using the table 400 the public telephone number of the B-subscriber corresponding to the A-subscriber-dialed shortened number is dialed to initiate a connection between the A-subscriber and the B-subscriber.

In the intelligent network center 502, after or during the identification of the A-subscriber and verification of the right to the service, a redundant billing record is recorded in which the connection to the B-subscriber is identified by the shortened number entered by the A-subscriber. Optionally, a further redundant billing record may also be recorded in which the connection to the B-subscriber is identified by the B-subscriber's public telephone number corresponding to the shortened number entered by the A-subscriber.

Referring now to FIG. 3B, a second embodiment of the first mobile telephone exchange 106 is shown. In this embodiment, the lower level switching part 506 is integrated into the mobile phone center 500. The lower level switching part 506 is then connected to the upper level control part 502 via the communication link 508.

Figure 4:
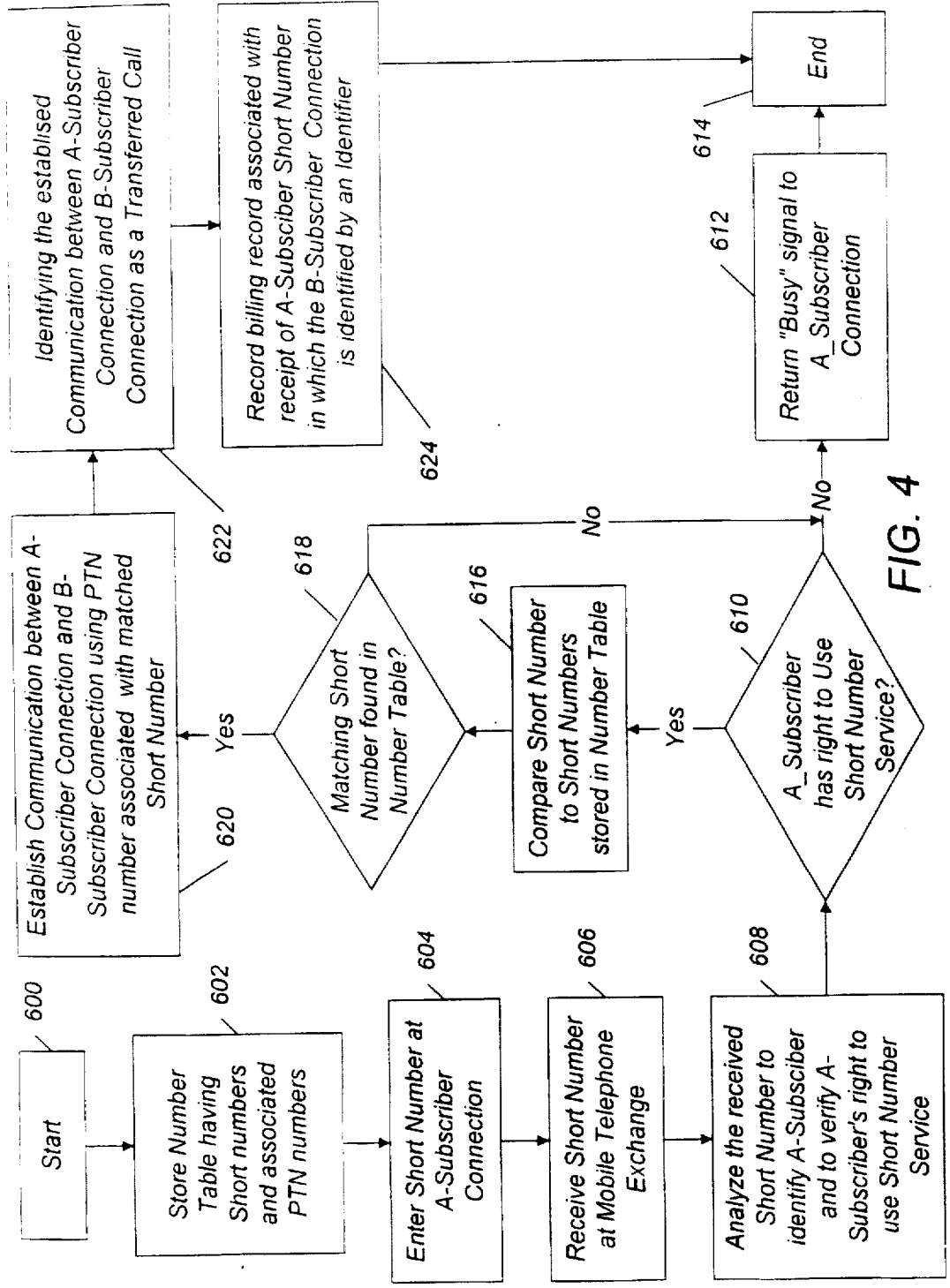
FIG. 4 is a logic flow diagram representative of an exemplary method of operation of the apparatus shown in FIG. 1 in accordance with the present invention.

Referring now to FIG. 4, exemplary method of operation of the present invention is illustrated in a form of a logic flow diagram. The operation begins at step 600 and proceeds to step 602 where a number table, such as for example table 400 of FIG. 2, containing short numbers and associated public network telephone (TN) numbers of B-subscribers is stored. At step 604, the A-subscriber enters a short number at the A-subscriber mobile station 102. At step 606, the short number is received at a mobile telephone exchange, such as the first mobile telephone exchange 106. At step 608, the received short number is used to identify the A-subscriber and then used to verify whether the A-subscriber has a right to use the short number service. At test 610, if the A-subscriber does not have the right to use the short number service, at step 612 a "busy" signal is returned to the A-subscriber and at step 614 the operation ends. Otherwise, if A-subscriber does have the right to use the short number service, at step 616 the received short number is compared to short numbers in the number table to determine whether a match is found. If a match is not found, at step 612 a "busy" signal is returned to the A-subscriber and the operation terminated at step 614. Otherwise, if a match is found, at step 620, a B-subscriber's PTN number associated with the matched short number is dialed to establish a communication path between the A-subscriber and the B-subscriber. At step 622, the communication between the A-subscriber and the B-subscriber is identified as a "transferred call" so that no further call transfers are possible. At step 624, a billing record associated with the receipt of the A-subscriber's short number at step 606 is recorded. The billing record identifies the B-subscriber connection with an identifier such as the A-Subscriber's short number or by the B-subscriber's PTN number associated with the A-subscriber's short number. The operation is then terminated at step 614.

The invention has hereinabove been described with particular reference to one of its advantageous and profitable implementation examples. However, by this it is not intended to restrict the invention to apply only to this example, but rather to all variations in the spirit of the inventive idea as presented by the following claims.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for establishing a communications path originating from an A-subscriber connection at a first mobile station of a first mobile communication network to a B-subscriber connection of one of the first mobile communication network, a second mobile communication network and a telecommunication network, the first mobile communication network comprising a plurality of mobile stations each associated with one of a plurality of A-subscribers, a base station having a limited coverage area and with which said plural mobile stations connect for communicating with one of a plurality of B-subscribers, and a mobile phone exchange to which the base station is connected for switching connections within the first mobile communication network and between the first mobile communication network and the second mobile communication network and telecommunication network, said method comprising the steps of:

prestoring at the mobile phone exchange a table identifying, for each of a plurality of public telecommunication network numbers each delineating a sequence of alphanumeric digits normally dialed by a communication-originating A-subscriber and used by the mobile phone exchange for directing a telecommunication connection to a particular one of the plural B-subscribers, a corresponding short number comprising a prefix number common to the plural A-subscribers and an A-subscriber-dependent selected abbreviated number for identifying the corresponding public telecommunication network number associated with a particular one of the plural B-subscribers;

entering, at the A-subscriber connection at a first mobile station, a short number for initiating establishment of a communications path from the A-subscriber connection to a selected B-subscriber connection;

receiving at the mobile phone exchange the short number entered at the A-subscriber connection;

analyzing at the mobile phone exchange the received short number entered at the A-subscriber connection to identify the A-subscriber from whom the received short number was received and to verify the identified A-subscriber's right to use short number service;

comparing the received short number to the plural short numbers prestored in the table at the mobile phone exchange to identify the corresponding public telecommunication network number associated with a particular one of the plural B-subscribers; and using the identified corresponding public telecommunication network number at the mobile phone exchange to establish a communication path from the A-subscriber connection at which the received short number was entered to the particular B-subscriber connection associated with the corresponding public telecommunication network number.

2. In a method in accordance with claim 1, further comprising the step of recording, at the mobile phone exchange, a billing record associated with said receipt of the A-subscriber entered short number and in which the B-subscriber connection is identified by the short number entered by the A-subscriber.

3. In a method in accordance with claim 1, further comprising the step of identifying, at the mobile phone exchange, the established communication path as a transferred call to thus prevent further call transfer thereof.

4. In a method in accordance with claim 1, wherein the mobile phone exchange comprises a mobile phone center of an intelligent network and is associated and communicates with an intelligent network center having an intercommunicating upper level control part and lower level switching part, further comprising the step of recording, at the mobile phone center, a billing record associated with said receipt of the A-subscriber entered short number and in which the B-subscriber connection is identified by the short number entered by the A-subscriber, wherein said analyzing step further comprises changing the received short number to a modified dialing comprising a service key, further comprising the steps of:

communicating the service key and an identification of the A-subscriber from whom the received short number was received from the mobile phone center to the intelligent network center, and using at the intelligent network center the transmitted A-subscriber identification to verify the A-subscriber's right to use short number service, and wherein said using step further comprises preventing establishment of a communication path from the A-subscriber connection to a B-subscriber connection and directing to the A-subscriber a busy tone where at least one of the A-subscriber is determined to not have the right to use short number service, the A-subscriber entered short number is not found in the table of prestored short numbers, and the A-subscriber entered short number exceeds a largest prestored short number in the table of prestored short numbers.

5. A method in accordance with claim 4, further comprising the step of recording at the intelligent network center, in association with said verifying at the intelligent network center of the A-subscriber's right to use short number service, a redundant billing record in which the B-subscriber connection is identified by the short number entered by the A-subscriber.

6. A method in accordance with claim 4, further comprising the step of recording at the intelligent network center, in association with said verifying at the intelligent network center of the A-subscriber's right to use short number service, a redundant billing record in which the B-subscriber connection is identified by the public telecommunication network number corresponding to the short number entered by the A-subscriber.

7. A method in accordance with claim 4, wherein said communications between the mobile phone center and the intelligent network center are carried out through one of a public telecommunication network, a closed dedicated network, a permanent connection, and a direct channel.

8. A method in accordance with claim 4, wherein the lower level switching part comprises an integral part of the mobile phone center and communicates with the intelligent network center through one of a public telecommunication network, a closed dedicated network, a permanent connection, and a direct channel.

* * * * *